United States Patent
McIntyre et al.

(10) Patent No.: US 6,178,363 B1
(45) Date of Patent: Jan. 23, 2001

(54) INERTIALLY AUGMENTED GPS LANDING SYSTEM

(75) Inventors: Melville D. McIntyre, Bellevue; Leonard R. Anderson, Lynnwood, both of WA (US)

(73) Assignee: The Boeing Company, Seattle, WA (US)

(*) Notice: Under 35 U.S.C. 154(b), the term of this patent shall be extended for 0 days.

(21) Appl. No.: 09/219,552

(22) Filed: Dec. 22, 1998

(51) Int. Cl.[7] .............................. G06F 19/00; G06G 7/70; G01S 13/00; G01S 5/02; H04B 7/185
(52) U.S. Cl. .......................... 701/16; 342/33; 342/357.14; 342/357.17
(58) Field of Search .................................. 342/357.06, 33, 342/34, 35, 357.03, 358, 357.17, 357.13, 357.14; 701/16, 17

(56) References Cited

U.S. PATENT DOCUMENTS

| | | |
|---|---|---|
| 4,866,450 | 9/1989 | Chisholm . |
| 4,894,655 | 1/1990 | Joguet et al. . |
| 5,193,064 | 3/1993 | Maki . |
| 5,216,611 | 6/1993 | McElreath . |
| 5,311,194 | 5/1994 | Brown . |
| 5,432,520 | 7/1995 | Schneider et al. . |
| 5,461,388 | 10/1995 | Applegate et al. . |
| 5,583,774 | 12/1996 | Diesel . |
| 5,606,506 | 2/1997 | Kyrtsos . |
| 5,657,025 | 8/1997 | Ebner et al. . |

*Primary Examiner*—Thomas H. Tarcza
*Assistant Examiner*—Fred H. Mull
(74) *Attorney, Agent, or Firm*—Christensen O'Connor Johnson Kindness PLLC (57) ABSTRACT

An airplane precision approach guidance system and method. The airplane precision approach guidance system includes: (i) GPS landing system (GLS) components (12) for receiving and processing signals from GPS satellites (30) and a GPS ground station (32) and generating a first set of velocities; (ii) an inertial reference system (IRS)(20) for generating a second set of velocities; and (iii) guidance software (24) for generating a cross-runway velocity and a lateral distance from runway centerline based on received runway centerline information and the generated first and second set of velocities. The airplane precision approach guidance system also includes flight instruments (26) and an autopilot system (28) for receiving and processing the information produced by the guidance software. The guidance software may be executed by a conventional airplane processor, such as the GLS processor, the IRS processor or the airplane's autopilot processor, or by a separate stand-alone processor. The runway centerline information may be stored at the ground station or in local memory. The ground station can also provide differential GPS information. In airplanes that include redundant systems, voting is used to determine which IRS supplies the second set of velocities.

36 Claims, 12 Drawing Sheets

INERTIALLY AUGMENTED GPS LANDING SYSTEM

FIELD OF THE INVENTION

This invention relates to methods and apparatus for providing precision information for airplanes during initial and terminal phases of flight, and more specifically, methods and apparatus for performing precision guidance using a global positioning system, and an inertial reference system.

BACKGROUND OF THE INVENTION

As will be understood from the following description, the present invention was developed for increasing the availability of precision approach landings using a Global Positioning System (GPS) Landing System (GLS) and an Inertial Reference System (IRS) at airports anywhere in the world.

The Automatic Landing Systems (i.e., autopilots) on today's commercial airplanes receive their guidance from a ground-based Instrument Landing System (ILS). In low weather minimums, the integrity and continuity of the ILS transmissions are absolutely crucial to the safety of the airplane during the final phase of approach, touchdown and roll-out. ("Integrity" is the probability that the signals are not hazardously misleading. "Continuity" is the probability that the signals remain present and usable during the approach). The integrity is assured by a set of near-field and far-field monitors, ready to shut down the ILS should the ILS signals move outside allowed tolerances. The continuity of the signals is assured by a backup transmitter. The backup transmitter comes on-line if the primary transmitter fails or is shut down. A key feature of today's systems is that the ground station has the sole responsibility for ensuring the integrity and continuity of its own transmissions. Because ILS equipment is costly due to initial purchase price and maintenance costs, ILSs are only practical at airfields that have large incomes generated by commercial traffic or government funding. Also, ILS signals are sensitive to local building construction and even vehicle movement. This sensitivity increases operating costs, because the ILS operators, such as the Federal Aviation Administration (FAA) in the US, must continually ensure each ILS is producing an accurate signal. Therefore, global implementation is not practical.

The GLS has been proposed as a replacement for ILS. GLS is attractive, because satellite signals are present everywhere in the world, at no cost to airports or other authorities responsible for providing airplane approach information.

In present GLSs, airplane position signals, determined from GPS signals sent by orbiting satellites, are augmented in the airplane by differential corrections (differential GPS) received from a local ground station. The differentially corrected GPS signals are referenced to an intended approach path received by the airplane from the same ground station. The ground station is also responsible for monitoring each satellite and providing airplanes with the integrity status of each satellite. The integrity and continuity of the received airplane position signals depend on the number of satellites in the airplane's field of view, the satellites' positions in the sky (their "geometry"), and the data received from the ground station. The airplane's on-board equipment must determine that the signals being received from satellites and ground station will provide a level of integrity and continuity compatible with the prevailing approach weather minimum for the duration of the approach about to be performed. There will be times and places in the world where the satellites in view cannot support the required continuity and integrity for certain approaches, such as FAA Category 3 (Cat. 3) approaches.

Even when the satellite geometry supports the required continuity and integrity, the signals received by airplanes are subject to environmental threats, such as electromagnetic interference (EMI) (both accidental and malicious), lightning and ionospheric scintillation (i.e., brown-outs associated with sunspot activity). There is also the threat of random satellite failures and satellites setting over the horizon. These threats can affect the reception of some or all of the available satellite signals, resulting in degradation or loss of guidance. Some of the threats are not well understood, and will remain so for several years.

Several methods of enhancing GLS for providing acceptable signals for Cat. 3B and 3C (autoland) approaches have been proposed. One method is to enhance the satellite constellation by making use of another country's satellite system, such as the Russian GLONASS system. This approach places an added burden on the airborne equipment and has complex political implications. Another method uses so-called "pseudolites," ground-based transmitters, located on or near the airport, which mimic satellites by providing additional range information to the airplane. Similar to ILS, this approach is impractical, because it entails large equipment expenditures and maintenance costs in addition to those of the differential GPS ground station. Also, neither of these approaches adequately addresses the environmental and other threats described above, which may produce unreliable GLS data for an indefinite period of time.

Accordingly, a need exists for a low-cost, low-maintenance, worldwide useful, airplane precision approach guidance system that is highly accurate and reliable. The present invention combines the best features of GLS and IRS to fulfill this need.

SUMMARY OF THE INVENTION

In accordance with this invention, an airplane precision approach guidance system and method are provided. The airplane precision approach guidance system includes: (i) GPS Landing System (GLS) components for receiving and processing signals from GPS satellites and a differential GPS ground station and generating a first set of velocities; (ii) an inertial reference system for generating a second set of velocities; and (iii) guidance software for determining a cross-runway velocity and a lateral distance from runway centerline based on received runway centerline coordinates and the generated first and second set of velocities. The airplane precision approach guidance system also includes flight instruments and an autopilot system for receiving and processing the information generated by the guidance software and for guiding the airplane through approach, touchdown, and rollout. The runway centerline coordinates may be stored at the ground station or in local memory. The ground station can also provide differential GPS information and satellite health status information.

In accordance with other aspects of this invention, the guidance software can be included in (or spread between) the global positioning system, the inertial reference system or the autopilot system. That is, for example, the guidance software may be executed by the autopilot processor, i.e., the guidance software may take the form of a subroutine or program included in the autopilot and carried out by the autopilot processor. Alternatively, the guidance software may be executed by a separate, stand-alone processor.

In accordance with still other aspects of this invention, the guidance software includes a first filter for generating a first velocity in a first predefined direction based on velocities in the first predefined direction from the first and second set of velocities, a second filter for generating a second velocity in a second predefined direction based on velocities in the second predefined direction from the first and second set of velocities, and a third filter for generating a cross-runway velocity and a lateral distance from runway centerline based on received runway centerline information and the generated first and second velocities. The third filter further generates the lateral distance from runway centerline based on a lateral distance from runway centerline received from the global positioning system.

In accordance with further aspects of this invention, the first and second filters estimate and store the velocity and acceleration biases in the first and second predefined directions of the velocities received from the inertial reference system based on the velocities received from the global positioning system.

In accordance with still further aspects of this invention, the first and second filters generate the first and second velocities based on the estimated and stored velocity and acceleration biases when the velocities received from the global positioning system become unavailable or unusable.

In accordance with yet other aspects of this invention, the first, second, and third filters are Kalman filters.

In accordance with still other aspects of this invention, the first, second, and third filters are complementary filters.

In accordance with yet still other aspects of this invention, the first and second filters are second order complementary filters and the third filter is a first order complementary filter.

In accordance with other further aspects of this invention, redundant inertial reference systems, each of which produces a second set of velocities, are provided. The guidance software includes first and second filters for each second set of velocities and decides which second set of velocities to use when determining a cross-runway velocity and a lateral distance from runway centerline. Preferably, three inertial reference systems and, thus, three second sets of velocities are provided and the decision is based on which second set of velocities lies between the other two second sets of velocities.

As will be readily appreciated from the foregoing summary, the invention provides inertially smoothed GLS guidance information and the ability to coast on (use only) IRS guidance information with its velocity and acceleration biases corrected using the previously known GLS information.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
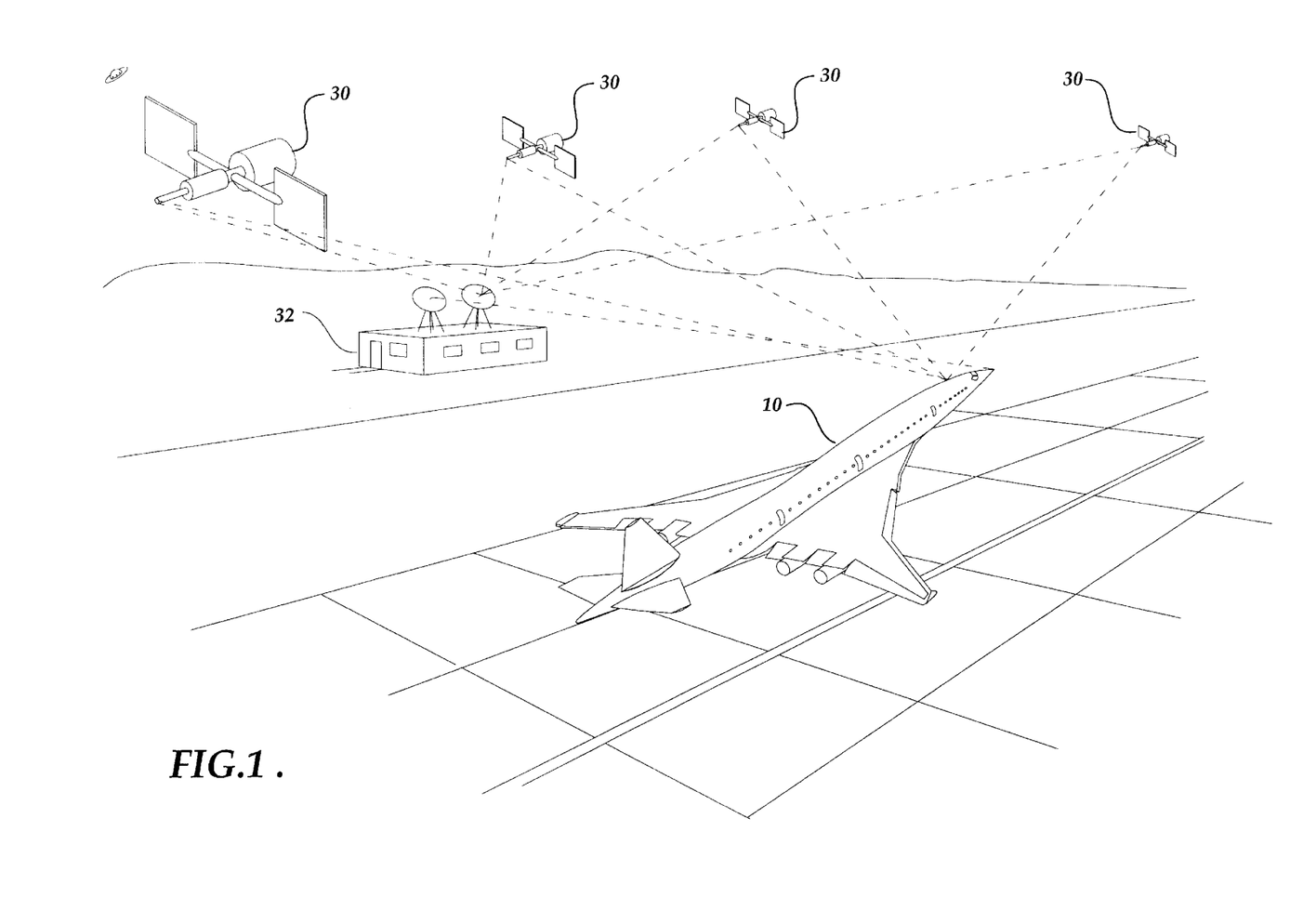
FIG. 1 is a schematic diagram that illustrates components external to an airplane required by the preferred embodiment of the present invention.
Figure 2:
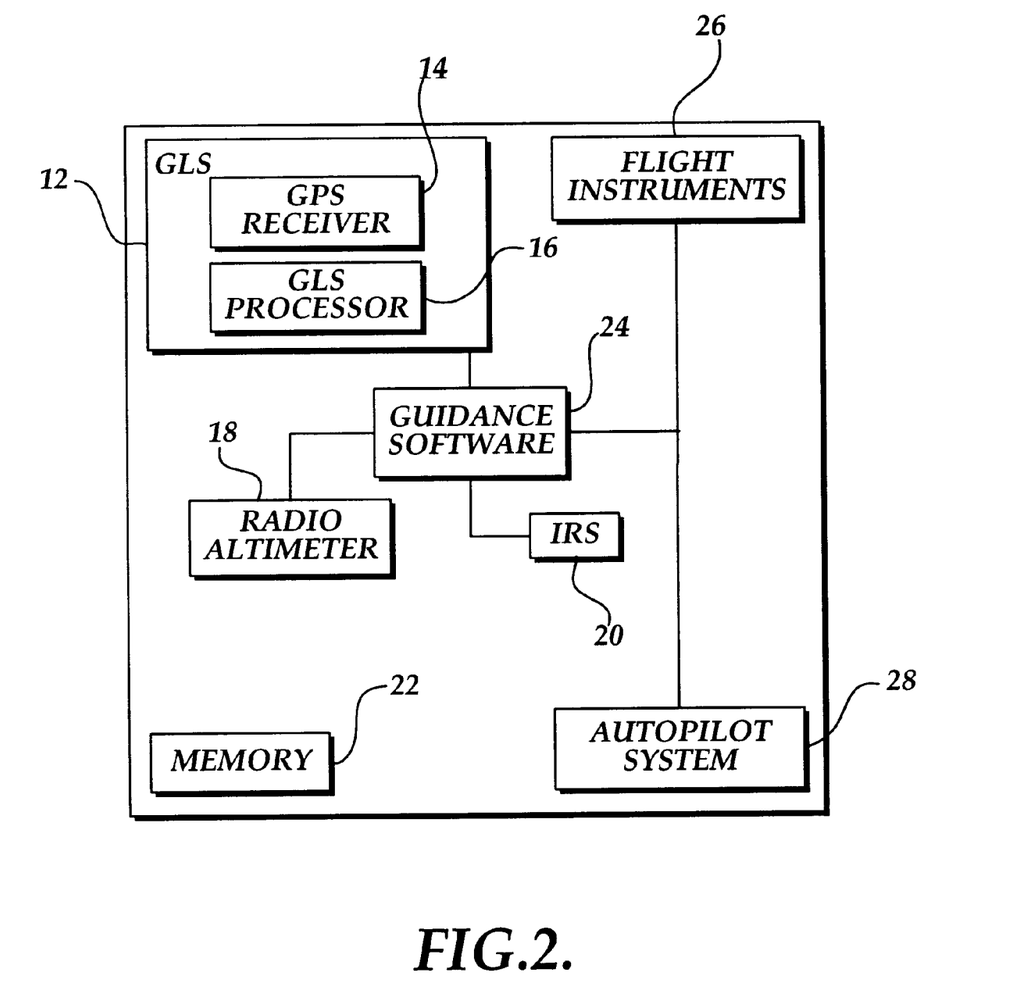
FIG. 2 is a block diagram illustrating the components internal to an airplane required by the preferred embodiment of the present invention.

In accordance with this invention, an airplane precision approach guidance system that includes a Global Positioning System (GPS) Landing System (GLS) augmented with an Inertial Reference System (IRS) is provided. The airplane precision approach guidance system includes a GLS that includes components both internal and external to an airplane, an IRS, flight instruments, an autopilot system capable of performing automatic landings and roll-out, and a guidance process for supplying signals to the flight instruments and autopilot system. The guidance process is a program, preferably a software program. Preferably, the guidance software physically resides in the GLS receiver, the IRS or the autopilot and is executed by the processor(s) included in the system in which the software resides. That is, the guidance software may take the form of a program or subroutine included in the program that controls the operation of the GLS receiver, the IRS or the autopilot. Alternatively, the guidance software could execute on a separate, stand-alone processor. For ease of illustration and description, the guidance software is depicted and described as a separate element or component of the invention. As shown in FIG. 1, the components of the GLS external to an airplane 10 are a set of satellites 30 and a differential GLS groundstation 32. As shown in FIG. 2, the components of the GLS that are internal to the airplane 10 include a GPS receiver 14 and a GLS processor 16 for receiving and processing signals from the satellites 30 and the differential GLS groundstation 32. The other internal airplane components include a radio altimeter 18, an IRS 20, memory 22, the guidance software 24, flight instruments 26, and an autopilot system 28.

Some of today's autopilots operating within an Instrument Landing System (ILS) environment have the ability to "coast" solely on navigation data supplied by the IRS (i.e., inertial guidance) for both vertical and lateral airplane control, but only for periods of a few seconds during an ILS transmitter switch-over or a temporary interruption of the signal sent by the ground-based ILS. The present invention uses IRS data to augment an airplane's GLS so that the autopilot has the ability to coast accurately for a much longer period of time. The GLS is subject to periods of time when the GLS guidance signals are out of acceptable limits for continuing a precision approach. The causes of such an occurrence might be satellite failure, lack of an acceptable number of satellites sending signals, accidental or malicious electromagnetic interference (EMI), lightning, ionospheric scintillation (i.e., brown-outs associated with sunspot activity), or other unknown interruptions, all collectively called environmental and other threats. The period of time that the GLS may produce unacceptable guidance signals can be several minutes, thereby requiring the airplane's autopilot to coast for a period up to a minute on an approach. If the autopilot were to receive only uncorrected or partially corrected guidance information from the IRS during the period of time the GLS is producing unacceptable guidance signals, the precision of the autopilot approach would be unacceptable for landing and rollout. The precision of the autopilot approach, landing, and rollout would be unacceptable because the uncorrected or partially corrected IRS data is not sufficiently accurate to be used for the period of time that the GLS can produce unacceptable signals. This is due to the normally occurring errors in the IRS which tend to be sinusoidal and have a period of oscillation of about 84 minutes (known as the Schuler error). In summary, the uncorrected or partially corrected IRS signals, if they were to be used for the minute or so that the GLS guidance signal is unacceptable, would provide unacceptable guidance control signals to the autopilot, thereby causing the airplane to land off or roll off the runway. The problem is more acute in lateral control than in vertical control, because the autopilot must coast on inertial guidance from the time the GLS is abandoned (typically below 200 feet height above the runway) all the way through roll-out, whereas for vertical control the autopilot need only coast until the airplane's radio altimeter takes over at approximately 50 feet above the runway. While the present invention when applied to precision landing approaches is preferably applied to an airplane's lateral control, the present invention can also be applied to vertical control during all flight regimes, e.g., landings, takeoffs, weapons release, etc.

The GPS receiver 14 within the GLS 12 receives position information from the satellites 30 and receives differential position information and runway approach path coordinates from the differential GPS groundstation 32. If the received position information is determined to be acceptable for guidance, the GLS processor 16 processes the received position information and generates GLS guidance signals. The guidance software 24 processes: (i) the GLS guidance signals, (ii) guidance information generated by the IRS 20, and (iii) guidance information generated by the radio altimeter 18. Based on the information it receives, the guidance software generates guidance information for the flight instruments 26 and the autopilot system 28. When the received GLS position information is determined to be unacceptable, the lateral control guidance information reverts to IRS generated information adjusted using bias estimates calculated during the period of time when the GLS signal was known to be healthy. The type of GLS and IRS guidance information and the type of guidance information produced by the guidance software executed by the processor of the GLS receiver 12, the IRS 20 or the autopilot system 38, or a stand-alone guidance processor, is described in more detail below.

Figure 3:
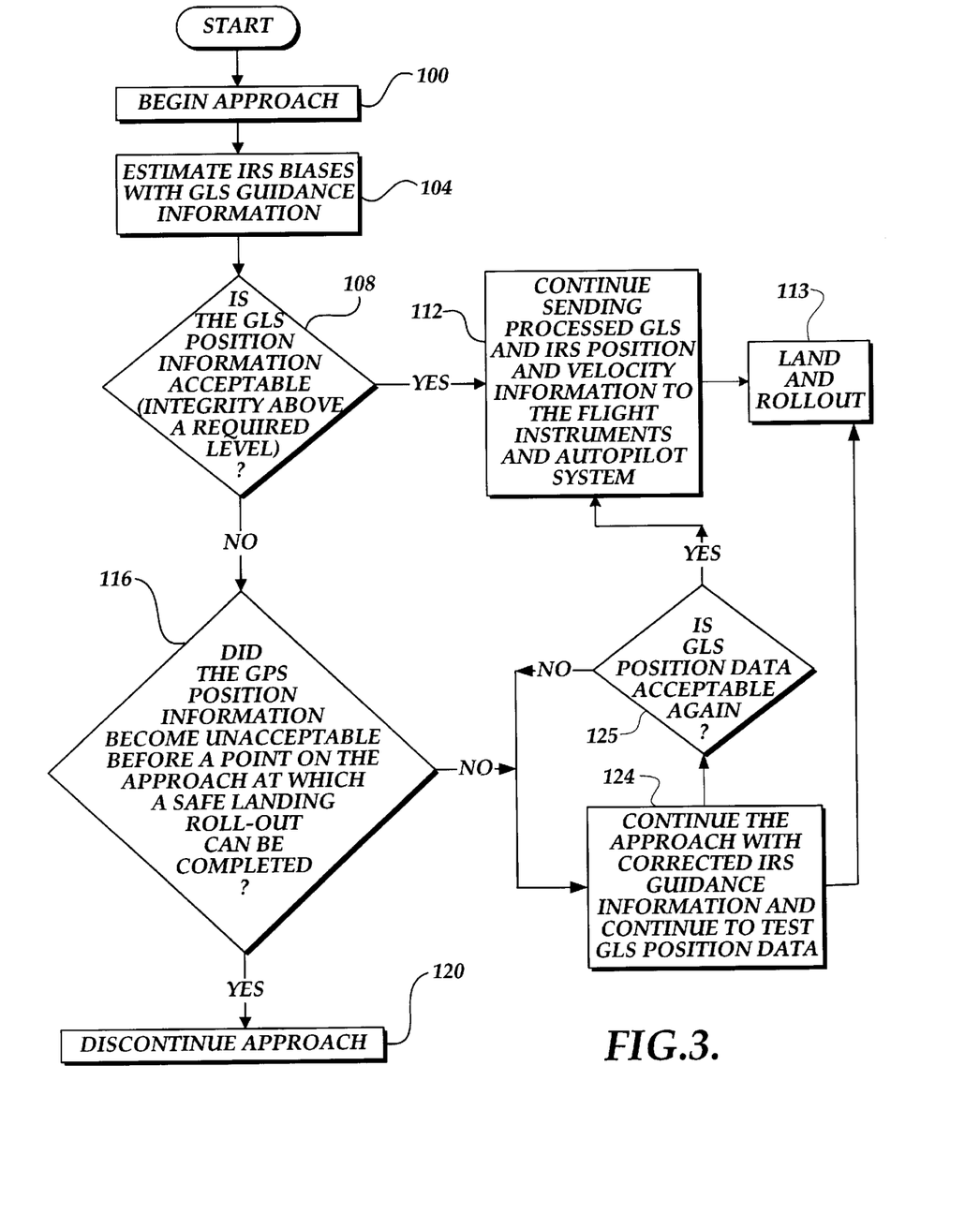
FIG. 3 is a flow diagram illustrating a process performed by the components illustrated in FIGS. 1 and 2.
Figure 4:
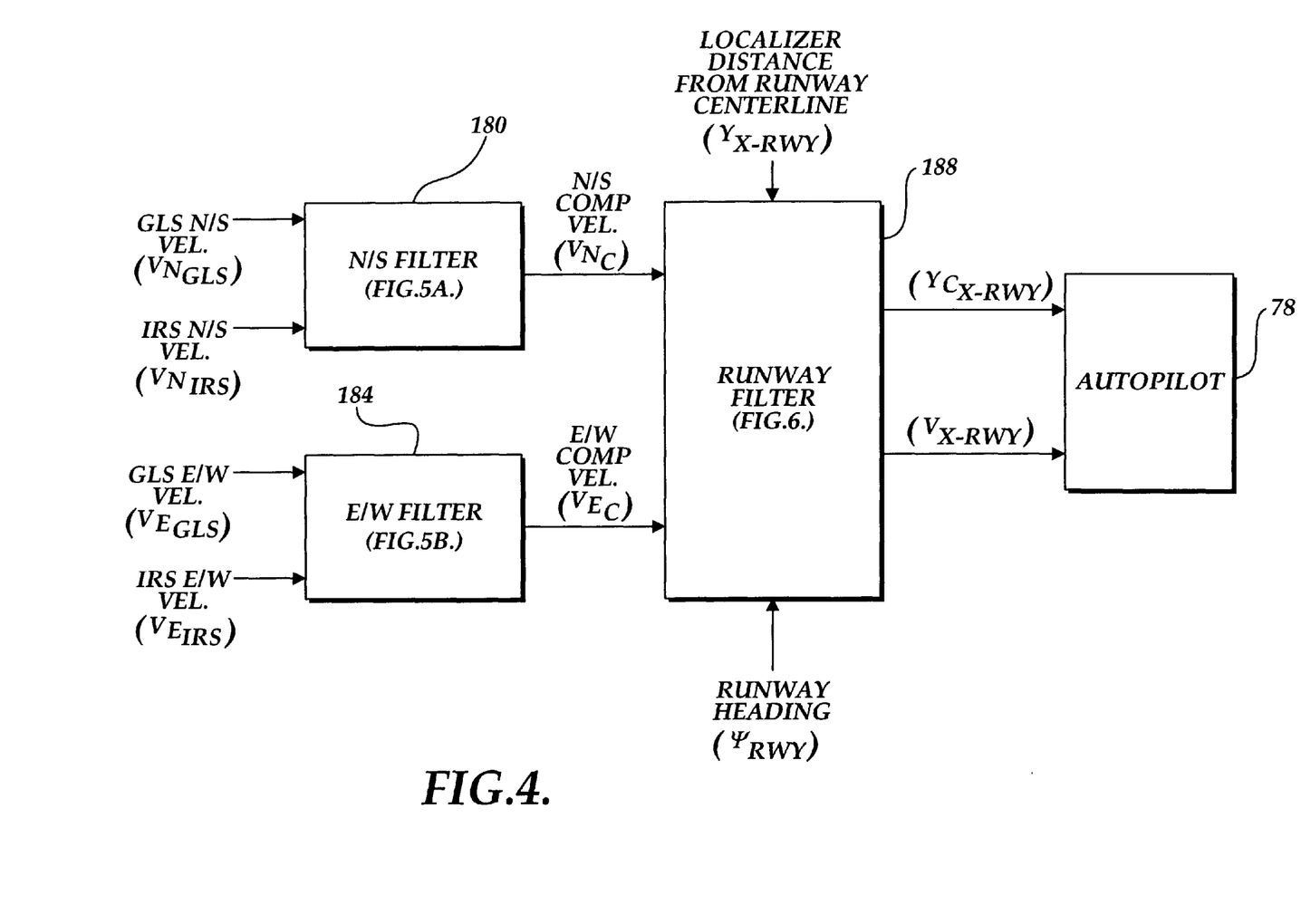
FIG. 4 is a block diagram illustrating filters included in the guidance software of the inertially augmented GLS illustrated in FIG. 2.

FIG. 3 is a functional flow diagram that illustrates the process performed by the components illustrated in FIG. 2 to provide approach information for a precision approach and roll-out. The guidance information generated by the present invention also may be used in other flight scenarios, such as low weather minimum takeoffs. At block 100, the airplane begins a precision approach to landing. At block 104, the IRS 20 velocity and acceleration errors are estimated by a filter, preferably a Kalman filter or a second order complementary filter, using the GLS guidance signals. This estimation, which may take from ten (10) seconds to a minute depending upon the specific type of equipment used, is illustrated in FIGS. 4–6 and described in more detail below. Thereafter, the GLS processor 16 continuously determines if the satellite produced position information is acceptable. See decision block 108. If the position information is determined to be acceptable, i.e., the integrity of the GPS position information (i.e., the satellite signals) is determined to be above a required or acceptable level, the guidance software 24 continues processing the GLS and IRS guidance information together to provide guidance information to the flight instruments 26 and autopilot system 28 until landing and rollout. See blocks 112 and 113. However, if at decision block 108, the GLS position information becomes unacceptable, the system determines if the position information became unacceptable before a point on the approach at which a safe landing and roll-out can be completed with only the corrected IRS guidance information. See decision block 116.

If the position information became unacceptable after the point on the approach at which a safe landing and roll-out can be completed with corrected IRS guidance information only, the process continues the approach with only the corrected IRS guidance information and continues to test the GLS position data. See blocks 124 and 125. As long as the position information remains unacceptable, processing remains in the loop formed by blocks 124 and 125 until landing and rollout occur. If GLS position data becomes acceptable again (block 125), processing cycles to block 112.

If, at decision block 116, the position information becomes unacceptable before the point on the approach at which a safe landing and roll-out can be completed with only the corrected IRS guidance information, the approach is discontinued and a go-around is executed. The point on the approach at which safe landings and roll-outs occur using only corrected IRS guidance information can vary. The point on the approach is chosen based on the time it takes to complete the roll-out safely. The point on the approach or the time to complete roll-out is calculated by analyzing landing and roll-out lateral deviation from the centerline caused by worst case divergence of the corrected IRS guidance information. The point could be as low as 100 feet above the runway for a low precision IRS or as high as 500 feet above the runway for a high precision IRS.

FIG. 4 is a block diagram that illustrates a set of filters that are included in the guidance software 24 for determining precise lateral guidance information. As noted above and as will be readily appreciated by those skilled in information processing, rather than forming part of guidance software 24 executed on a separate processor, as might be suggested by FIG. 3, the filters shown in FIG. 4 may be included in software executed by other system components, such as the GLS 12, the IRS 20 or the autopilot system 28.

The set of filters includes North/South (N/S), East/West (E/W) and runway filters. While various types of Kalman filters can be used, preferably the N/S and E/W filters are second order complementary filters 180 and 184 and the runway filter is a first order complementary filter 188.

The N/S filter 180 receives GLS and IRS north/south velocities and the E/W filter 184 receives GLS and IRS east/west velocities ($V_{N_{GLS}}$, $V_{E_{GLS}}$, $V_{N_{IRS}}$, $V_{E_{IRS}}$). The GLS and IRS north/south and east/west velocities are generated by the GLS 12 and IRS 20, respectively. The output of the N/S filter 180 is a north/south complementary velocity ($V_{N_C}$) and the output of the E/W filter 184 is an east/west complementary velocity ($V_{E_C}$). Suitable N/S and E/W filters 180 and 184 are shown in FIGS. 5A and 5B and described in more detail below.

The north/south and east/west complementary velocities ($V_{N_C}$, $V_{E_C}$) are received by the runway (first order) complementary filter 188. The runway filter 188 also receives lateral distance from the runway centerline from the GLS ($Y_{X-RWY}$) and runway (centerline) true heading ($\Psi_{TRWY}$) from the GLS groundstation 32 or from memory 22. The runway filter 188 produces the airplane's compensated lateral distance ($Y_{C_{X-RWY}}$) from the runway centerline and a cross-runway velocity ($V_{X-RWY}$) based on the received information. $Y_{C_{X-RWY}}$ and $V_{X-RWY}$ are sent to the autopilot system 28 and the flight instruments 26 (shown in FIG. 2). A suitable runway filter 188 is shown in FIG. 6 and described in more detail below.

Figure 5A:
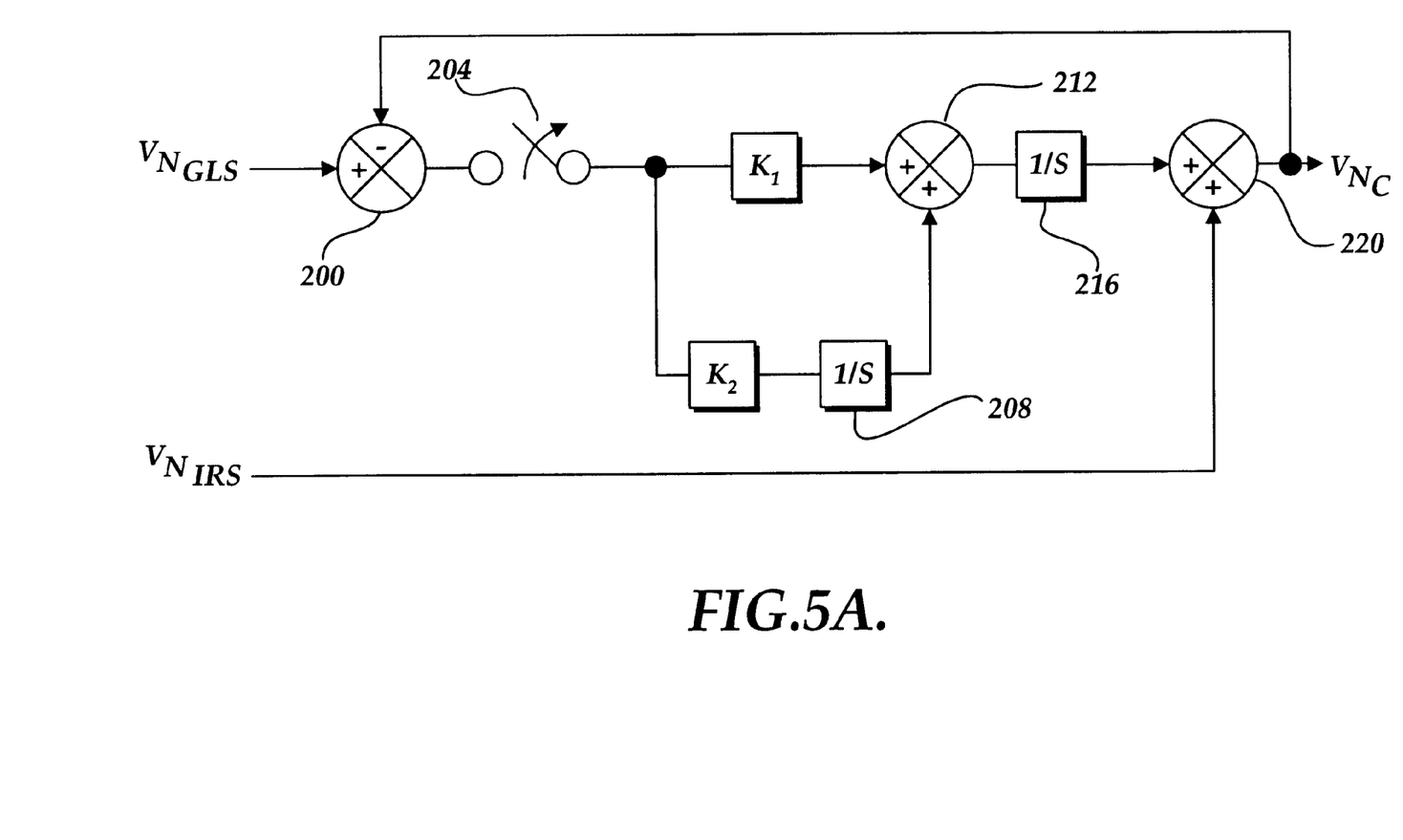
FIGS. 5A and 5B are control law diagrams of the second order complementary filters illustrated in FIG. 4.
Figure 5B:
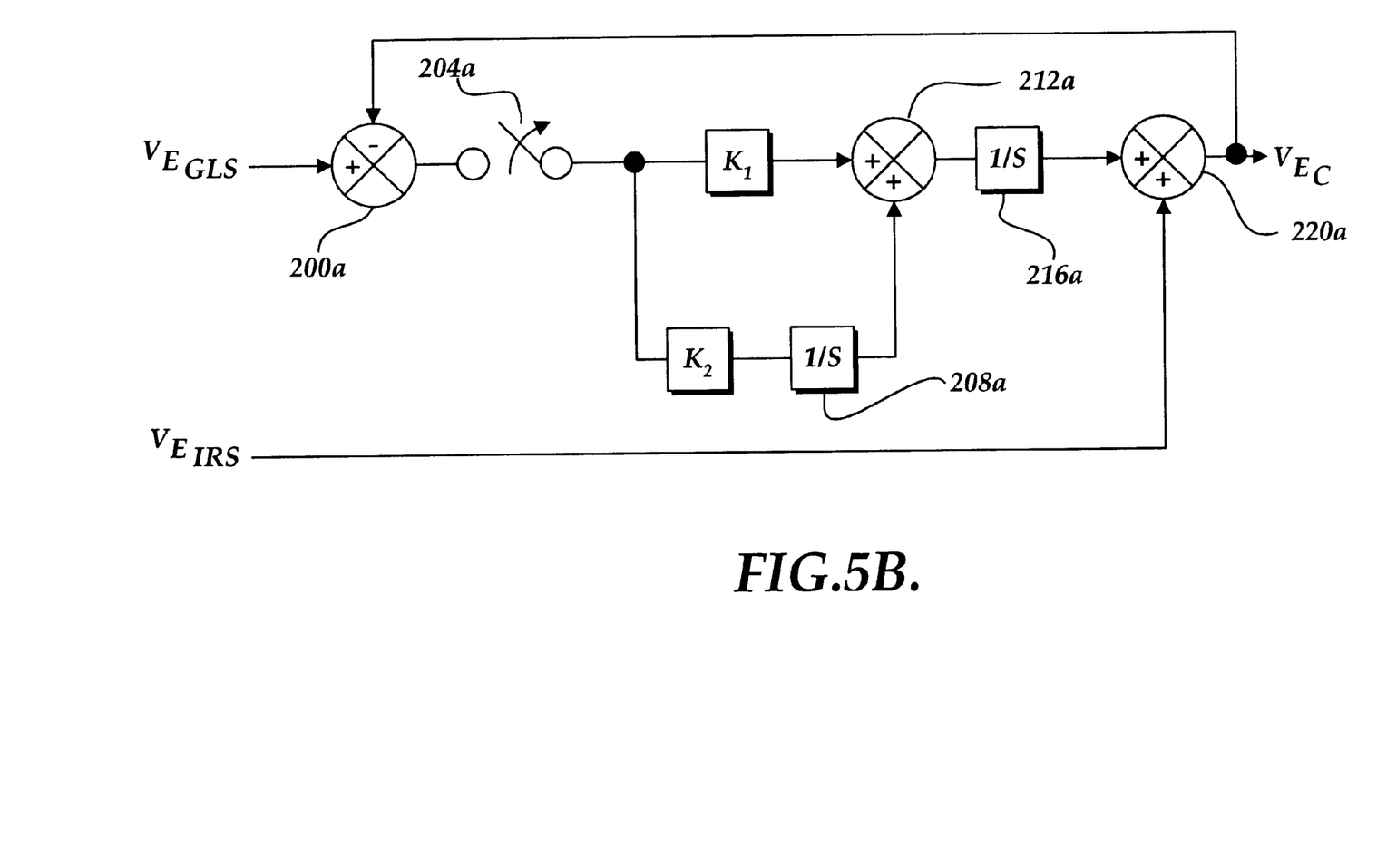
Figure 6:
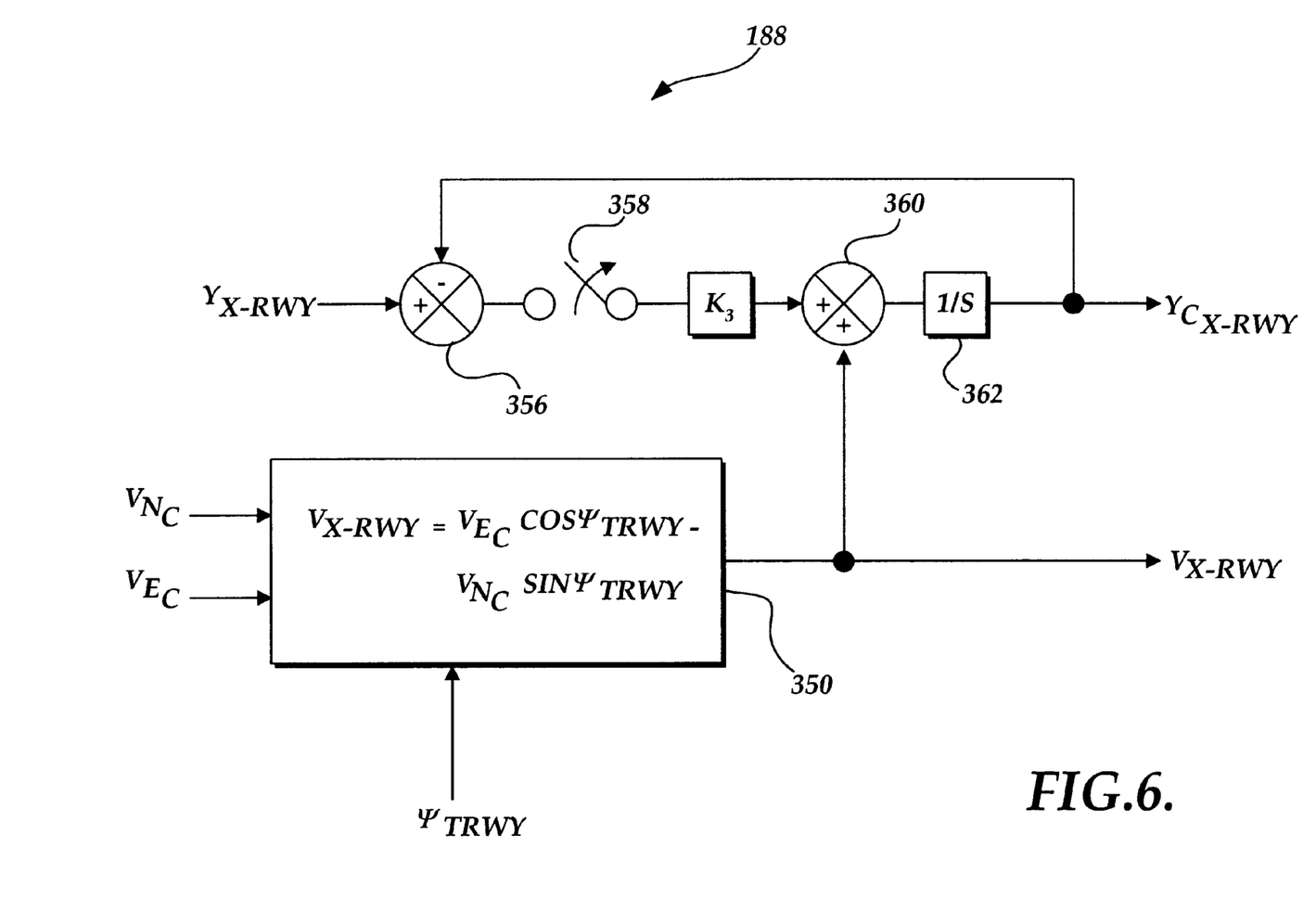
FIG. 6 is a control law diagram of the first order complementary filter illustrated in FIG. 4.

FIGS. 5A and 5B illustrate the components of suitable N/S and E/W filters 180 and 184 as shown in FIG. 3. As noted above, the N/S and E/W filters are second order complementary filters. It is to be understood that other types of filters, such as Kalman filters, can be used, if desired. For ease of illustration, the N/S and E/W second order complementary filters are shown in control law form. As will be readily appreciated by those familiar with airplane control systems, while often depicted in control law form for ease of illustration, complementary and other airplane control system filters are actually implemented in software designed for execution by the processors included in modem commercial and other airplanes.

The N/S second order complementary filter 180, shown in FIG. 5A, receives the GLS and IRS north/south velocities, $V_{N_{GLS}}$ and $V_{N_{IRS}}$. $V_{N_{GLS}}$ and $V_{N_{IRS}}$ are ground referenced velocities. $V_{N_{GLS}}$ is applied to the positive input of a subtractive combiner 200. The output of the subtractive combiner is applied to a switch 204. The switch 204 is opened if the received GPS position information is determined to be unacceptable and closed if the received GPS position information is determined to be acceptable. The GPS position information acceptability determination is performed by the GLS 12 based on preset requirements pertaining to received GPS position information. When switch 204 is closed, the output of the subtraction combiner is delivered to two paths. The first path includes a first gain $K_1$. The second path includes a second gain $K_2$ and a first bipolar integrator 208. Typical ranges for $K_1$ and $K_2$ are 0.05 to 1.0 and 0.001 to 0.5, respectively. Preferred values are 0.4 and 0.04, respectively. Values for the first and second gains $K_1$ and $K_2$ depend upon the airplane type and the types of inertial and GLS equipment used in an actual embodiment of the invention. The two paths terminate at a first additive combiner 212. The output of the first additive combiner 212 passes through a second integrator 216 to one input of a second additive combiner 220. $V_{N_{IRS}}$ is applied to the other input of the second additive combiner 220. Thus, the second additive combiner sums the result of the second bipolar integrator 216 and the received $V_{N_{IRS}}$. The output of the second additive combiner 220 is the complementary north/south velocity, $V_{N_C}$. $V_{N_C}$ is fed back to the negative input of the subtractive combiner 200. Thus, the subtracting combiner subtracts $V_{N_C}$ from $V_{N_{GLS}}$.

Since the E/W second order complementary filter 184 shown in FIG. 5B is identical in form to the north/south second order complementary filter 180, it is not described in detail, except to note that similar reference numbers with the suffix "a" are used to identify the various components and to note that the inputs are the GLS and IRS east/west velocities $V_{E_{GLS}}$, and $V_{E_{IRS}}$, and the result is the complementary east/west velocity $V_{E_C}$. The $K_1$ and $K_2$ values are the same.

Figure 5C:
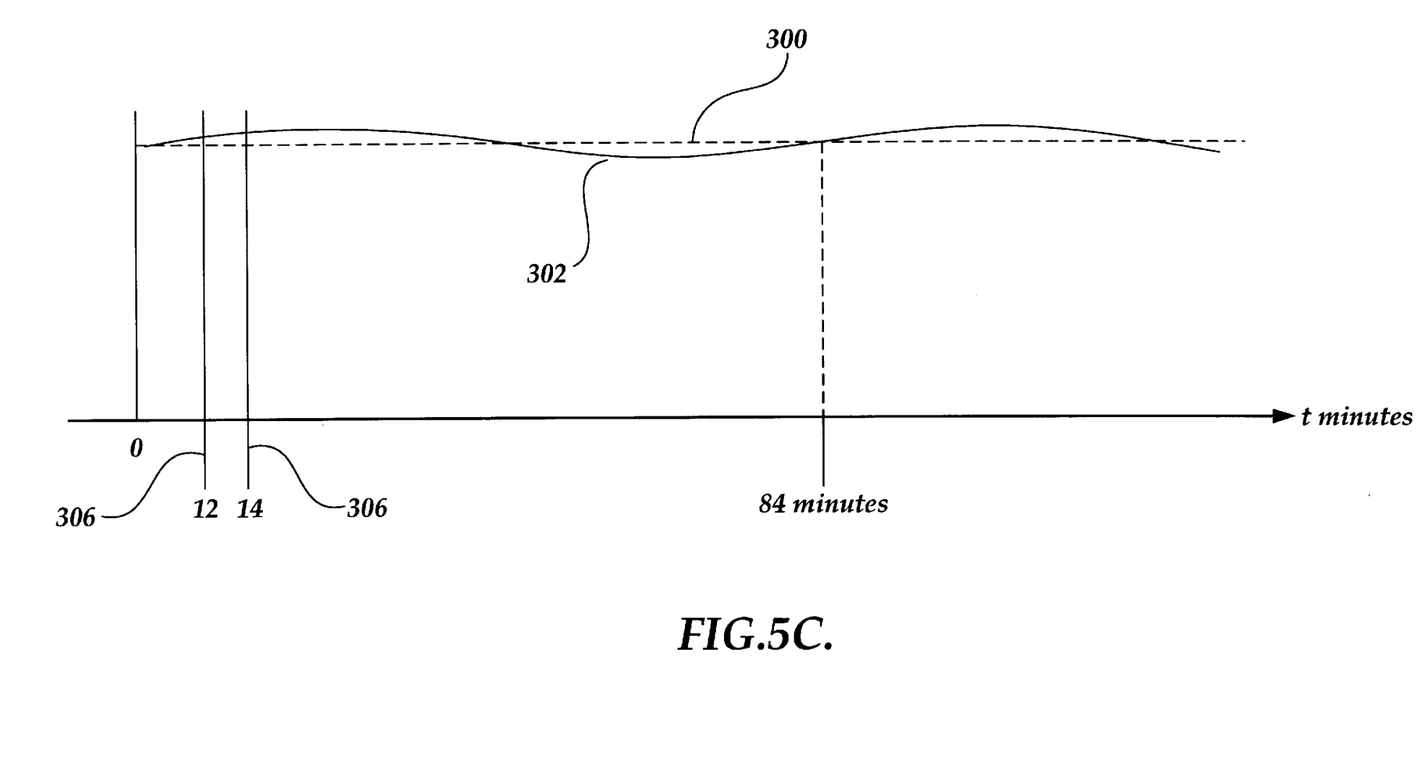
FIGS. 5C and 5D are graphs of velocity information received by the inertially augmented GLS illustrated in FIG. 2.

If the GPS position information becomes unacceptable, the switches in the N/S and E/W second order complementary filters are opened and the only input to the N/S and E/W second order complementary filters 180 and 184 becomes the IRS velocities $V_{N_{IRS}}$ and $V_{E_{IRS}}$. Because $V_{N_{IRS}}$ and $V_{E_{IRS}}$ originate from signals generated by inertial sensor devices within the IRS, they exhibit a dominant error whose period of oscillation is approximately equal to 84 minutes. As shown in FIG. 5C, which is a knots (kts) versus time (t-minutes) graph for either $V_{N_{GLS}}/V_{N_{IRS}}$ or $V_{E_{GLS}}/V_{E_{IRS}}$, this error, called the Schuler error, appears sinusoidal, as shown by curve 302.

The first integrator 208 estimates and stores an acceleration bias and the second integrator 216 estimates and stores a velocity bias. The stored velocity and acceleration biases correct $V_{N_{IRS}}$ to be equivalent to $V_{N_{GLS}}$ when the received GPS information is determined to be unacceptable. This adjustment occurs as follows. As soon as the switch 204 is open, the first integrator 208 freezes at the last determined acceleration bias value. The output of the second integrator 216, i.e., the last known velocity bias value, ramps based on the acceleration bias value stored in the first integrator 208. Then the ramped velocity bias value is applied to the received $V_{N_{IRS}}$ to generate $V_{N_C}$. As will be readily appreciated by those skilled in control law implementation, when the functions performed by the N/S and E/W filters 180 and 184 are implemented in computer code, the velocity and acceleration biases can be stored in computer memory, e.g. RAM.

The following example, using FIG. 5C, illustrates the operation performed by the N/S and E/W filters 180 and 184. In this example $V_{N_{GLS}}$ remains steady at some predetermined speed, e.g., 200 kts, represented by a straight line 300 in FIG. 5C. $V_{N_{IRS}}$, which exhibits the Schuler error, is represented by the sinusoidally oscillating curve 302 in FIG. 5C. If $V_{N_{GLS}}$ is not received because the GPS position information is unacceptable, in order to maintain accuracy, $V_{N_{IRS}}$ must be adjusted to equal what $V_{N_{GLS}}$ would have been. In order to adjust $V_{N_{IRS}}$ to equal $V_{N_{GLS}}$, the difference in amplitude between the $V_{N_{IRS}}$ curve 302 and the $V_{N_{GLS}}$ curve 300, and the slope of the $V_{N_{IRS}}$ curve 302 must be determined, prior to a loss of the GLS signal. Since the slope of the $V_{N_{IRS}}$ curve 302 is not a constant value, the results of adjusting $V_{N_{IRS}}$ over long periods of time eventually becomes inaccurate for the purpose of precision approaches. It is this inaccuracy that requires that a point (altitude) on the approach be determined above which to discontinue a precision approach and below which to continue the approach using only the adjusted IRS information. See decision block 116, FIG. 3. A minute or two has been found in a worst case IRS error scenario to provide acceptably accurate information. The approximate time period to safely complete the landing roll-out using only the corrected IRS information is about 1/84th that of one full $V_{N_{IRS}}$ Schuler oscillation. The time period represented by the space between vertical lines 306 in FIG. 5C is the approximate maximum period of time for completing a precision approach using only adjusted IRS information.

Figure 5D:
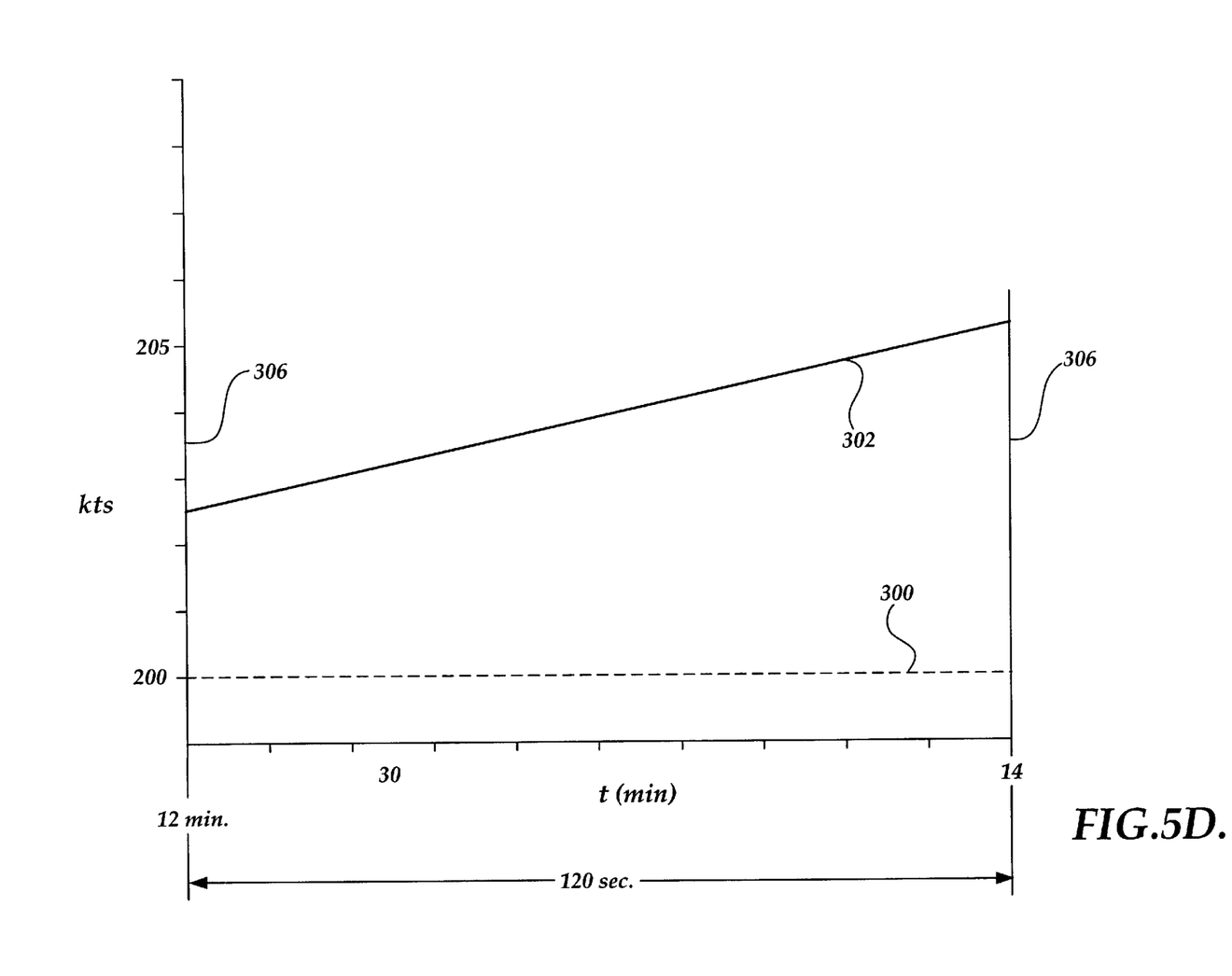

FIG. 5D, which is an enlargement of FIG. 5C between vertical lines 306, illustrates the time period for a final approach using only corrected IRS data as defined between lines 306 shown in FIG. 5C using the 200 kts exemplary speed. The approach time period is about 120 seconds. Before the GLS guidance signal becomes unacceptable, the difference (amplitude) between the $V_{N_{IRS}}$ curve 302 and the $V_{N_{GLS}}$ curve 300 (i.e., velocity bias) and the slope of the $V_{N_{IRS}}$ curve 302 (i.e., acceleration bias) are continuously being determined. As long as acceptable GPS signals are being received, the slope and amplitude of the $V_{N_{IRS}}$ curve 302 are accurately determinable. When the GLS signals become interrupted or unacceptable, the last known amplitude and slope of the $V_{N_{IRS}}$ curve 302 are used to adjust $V_{N_{IRS}}$ to create an accurate $V_{N_C}$ value. Since the slope of the $V_{N_{IRS}}$ curve 302 is relatively constant for about 1 to 2 minutes, an accurate output velocity can be determined. For example, if the GPS signals become interrupted or unacceptable at t=12 min in FIG. 5C, the $V_{N_{IRS}}$ is about 202.5 kts and is changing at about 1 kt/min. Thus, 202.5 kts and 1 kt/min are the estimated values that are then used to adjust $V_{N_{IRS}}$ for the remainder of the approach if and when the GLS signals become invalid. The error or bias estimations are done in earth-fixed axes rather than airplane-fixed, because the Schuler errors remain fixed in earth axes as the airplane turns. This allows the complementary filters to settle (i.e., the bias estimates to be generated) before the airplane has turned onto final approach. Also, the slope for a $V_{E_{IRS}}$ curve and the amplitude difference between the $V_{E_{IRS}}$ curve and a $V_{E_{GLS}}$ curve are determined in the same manner as described above for the $V_{N_{IRS}}$ and $V_{N_{GLS}}$ curves.

The high frequency noise (frequency 0.1 to 10 Hz) that is typically present in GLS signals can cause an autopilot system receiving only GLS guidance signals to send erroneous (noisy) flight control correction signals to the flight control surfaces. This is avoided by the present invention. When the GPS position information is acceptable, the relatively steady IRS guidance information inertially smoothes the GLS information making the complementary displacement and velocity signals, $Y_{X-RWY}$ and $V_{X-RWY}$, less noisy. The cleaner, less noisy signals cause the autopilot system 24 to provide smoother signals to the flight control surfaces.

As shown in FIG. 6, the runway filter 188 is a Kalman filter, specifically a first order complementary filter, that computes "cross-runway velocity", i.e., the component of the airplane's velocity that is perpendicular to the runway's true heading based on the complemented outputs of the N/S and E/W filters 180 and 184 (FIG. 4) and the runway true heading $\Psi_{TRWX}$. The runway true heading is the precise true heading of the approach runway and is supplied by the GLS groundstation 32 or the airplane system memory 22. Runway true heading is of extremely high integrity and is implicit in the approach path coordinates supplied by the ground station or memory. The runway filter 188 also generates a compensated lateral distance from runway centerline value ($Y_{C_{X-RWY}}$) based on the cross-runway velocity ($V_{X-RWY}$) and a lateral distance from runway centerline value ($Y_{X-RWY}$) generated by the GLS 12.

Returning to FIG. 6, the runway (first order complementary) filter 188 performs a cross-runway velocity process 350. The $V_{X-RWY}$ process 350 operates on the N/S and E/W filter outputs $V_{N_C}$ and $V_{E_C}$ and generates the cross-runway velocity $V_{X-RWY}$ based on the following equation:

$$V_{X-RWY} = V_{E_C} \cos\Psi_{TRWY} - V_{N_C} \sin\Psi_{TRWY}$$

where $\Psi_{TRWY}$ = Runway True Heading.

The lateral distance from runway centerline $Y_{XRWY}$ is received from the GLS 12. $Y_{X-RWY}$ is applied to the positive input of a subtractive combiner 356. The output of the subtractive combiner 356 passes through a switch 358 and is multiplied by a gain factor $K_3$. A typical range for $K_3$ is 0.1 to 1.0, preferably 0.4. The result is summed with the cross-runway velocity, $V_{X-RWY}$, in an additive combiner 360.

The output of the additive combiner is integrated by a bipolar integrator 362 and becomes the compensated lateral distance from runway centerline, $V_{C_{X-RWY}}$. The compensated lateral distance from runway centerline ($Y_{X-RWY}$) is applied to the negative input of the subtractive combiner 356. Thus, the subtractive combiner subtracts $Y_{C_{X-RWY}}$ from $Y_{X-RWY}$. When switch 358 is closed the compensated lateral distance from runway centerline ($Y_{C_{X-RWY}}$) is an inertially smoothed lateral displacement value. The switch 358, like switch 204, opens when GPS information becomes unacceptable. When this occurs, the compensated lateral distance from runway centerline ($Y_{C_{X-RWY}}$) is an integration of the cross-runway velocity ($V_{X-RWY}$) determined with biases removed. The integrators of the N/S and E/W filters 180 and 184 store the most recently determined bias information, thereby making available the bias information when needed. As will be readily appreciated by those skilled in airplane control signals, the filtered lateral displacement and the cross-runway velocity are used by the autopilot's lateral control laws and the flight instruments in a conventional manner.

When, on an approach, the GLS data becomes invalid and the switches 204, 204a and 358 open, the performance of the filters described above is transient-free and transparent to the autopilot's control laws. As a result, the airplane's response to wind, thrust asymmetry, and rudder inputs is unchanged. What has changed is that velocity and lateral distance from centerline are determined using only IRS information with biases removed. Because the adjusted IRS information was determined with a high degree of precision before the GLS was disconnected, the airplane is able to coast for many tens of seconds with no significant increase in touchdown dispersion.

Figure 7:
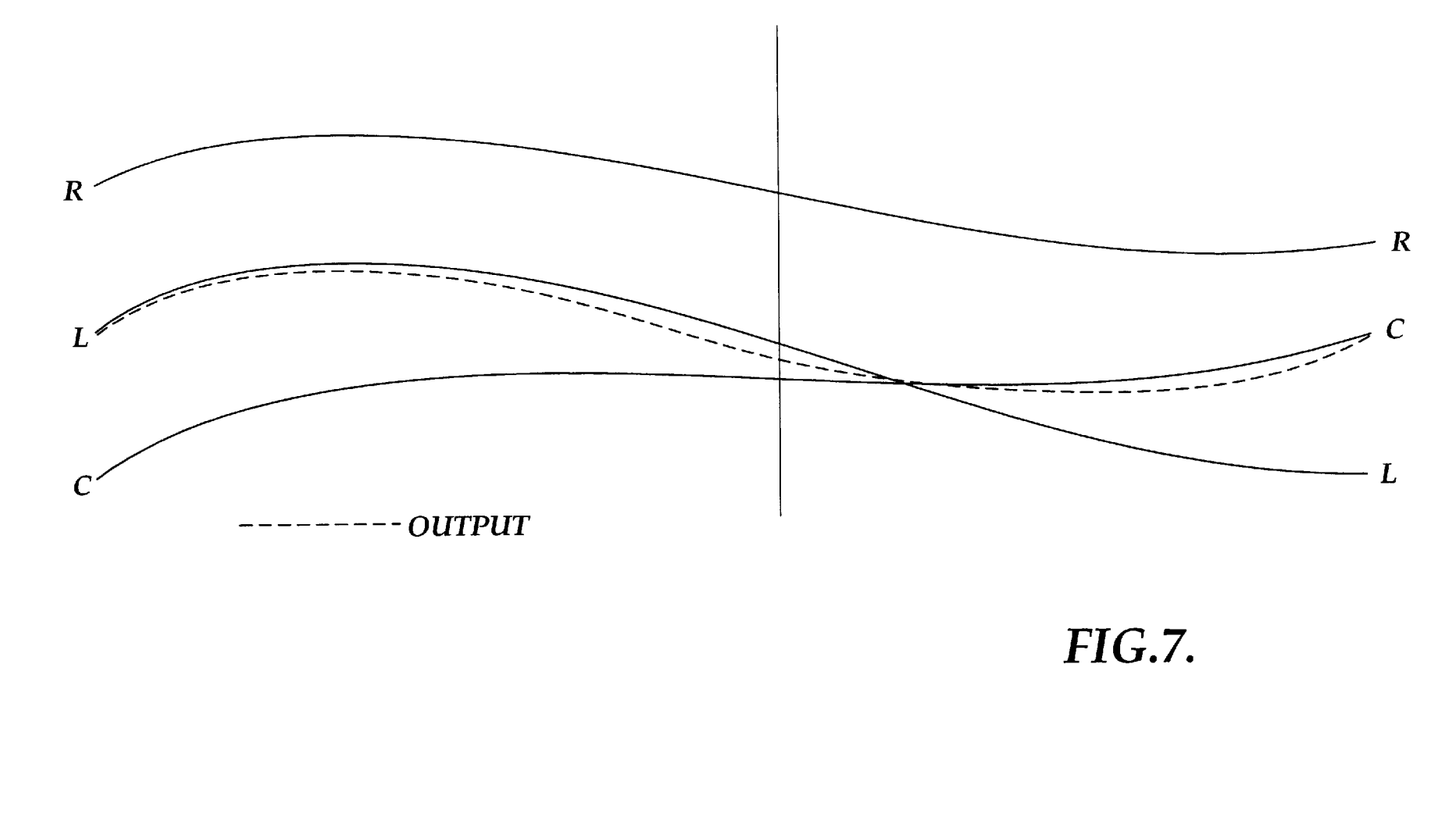
FIG. 7 is a graph of inertial reference unit generated guidance information (velocities)
Figure 8:
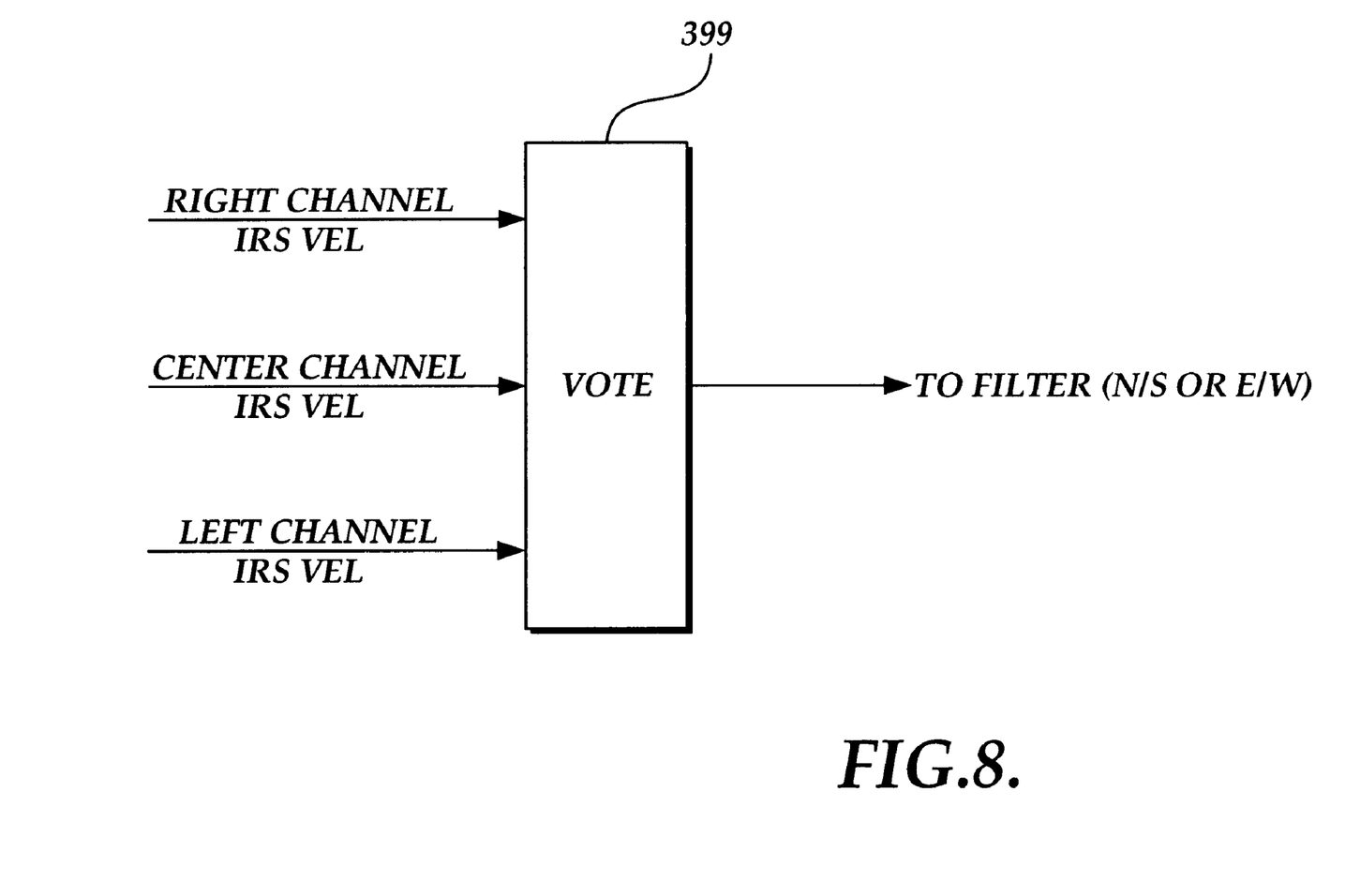
FIG. 8 is a diagram of a voting arrangement having some undesirable features that could be used when an airplane employing the invention has redundant inertial reference systems.
Figure 9:
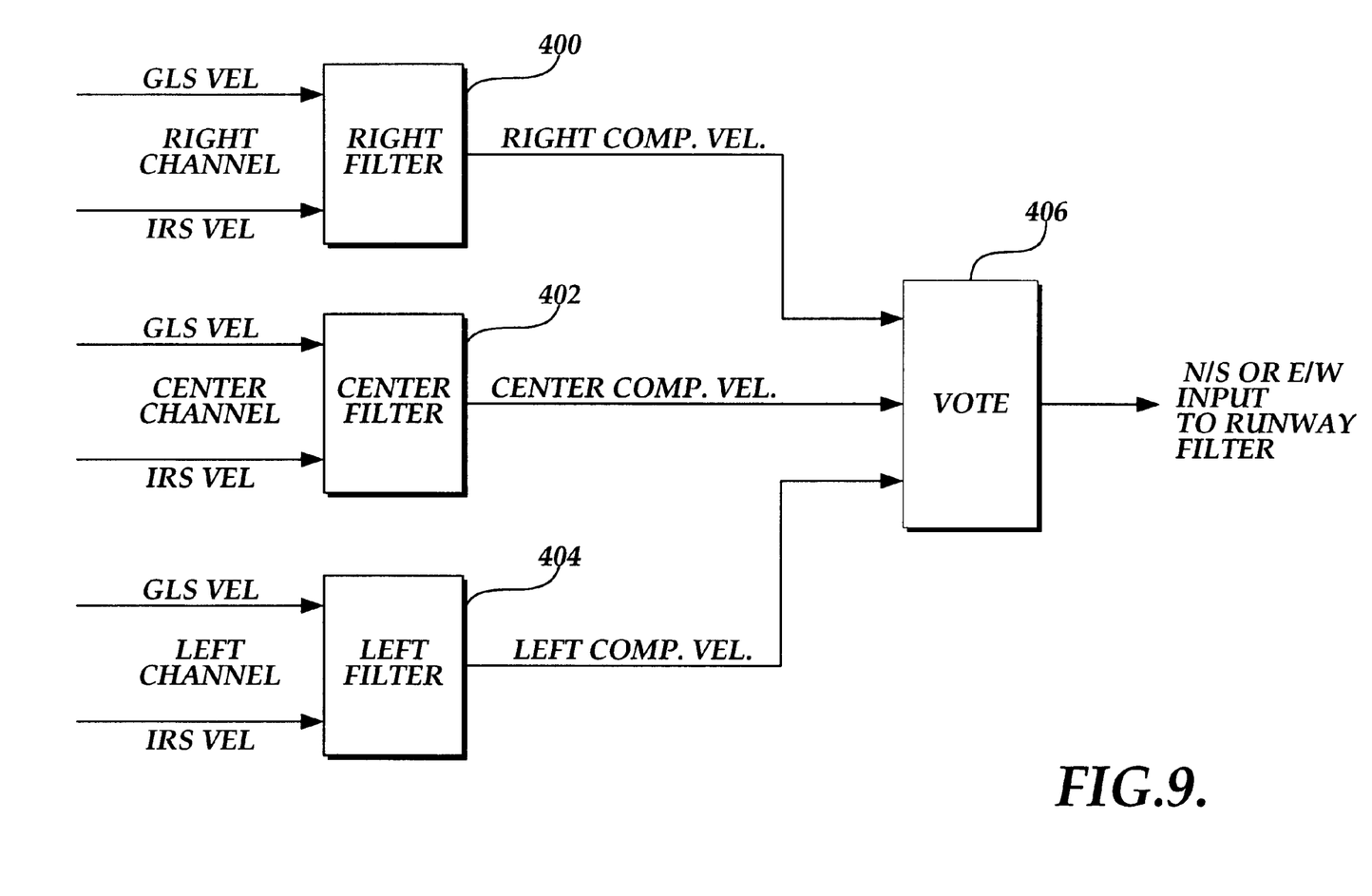
FIG. 9 is a diagram of a voting arrangement, usable when an airplane employing the invention has redundant inertial reference systems, that avoids the undesirable features of the voting arrangement shown in FIG. 8.

A typical IRS 20 includes redundant inertial reference units (IRUs) and also typically, when multiple IRUs are present, a vote of the IRUs is performed to determine the IRS guidance information to use. One type of voting algorithm is a mid-value select, i.e., the mid-channel IRU velocity value becomes the selected value. FIG. 7 illustrates right(R), left(L) and center(C) channel velocities generated by three redundant IRUs displayed over time. As can happen with redundant IRUs, and as shown in FIG. 7, the IRU that generates the mid-channel velocity can change over time. In this example, the L channel velocity is replaced by the C channel velocity because the C channel velocity has become the mid-channel velocity. When the change occurs, the acceleration bias for the old selected channel velocity (L) will be different from the newly selected channel velocity (C). If, as shown in FIG. 8, this voting 399 occurs prior to the application of the IRS velocity to the N/S and E/W filters, a discontinuity in the input to the runway filter can occur. As shown in FIG. 9, the invention avoids this undesirable result by having the voting performed after the N/S to E/W filters, before the runway filter. More specifically, each IRS "channel" includes its own N/S or E/W filter 400, 402 or 404. The filters may receive separate GLS velocity inputs, if redundant GLS data is available, or the same GLS data. The source of GLS data is not important since GLS data do not exhibit the kind of errors that are characteristic of IRS data. In any event, the outputs of the N/S or E/W filters 400, 402 or 44 are voted 406, and the center value is chosen as the data to be applied to the runway filter. In summary, each IRU's velocity and acceleration bias is estimated and corrected independently of the other IRUs. The resulting corrected velocities from the N/S and E/W filters are then voted to produce the selected corrected output. The end result of the voting arrangement shown in FIG. 9 is a smooth transition between the old and new selected channel velocities.

The present invention is equally applicable to other flight operations, such as guidance during takeoff. The velocity complementary filters can estimate the IRS biases prior to takeoff before turning onto the active runway. If, during the takeoff roll, the GLS guidance becomes unusable, the switch-over to IRS only information, described above, is made and the autopilot or flight director steers towards an accurate adjusted centerline track. Also, as noted above, the invention can be applied to vertical as well as lateral airplane position during a precision approach landing.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An airplane guidance processor coupled to a global positioning system for generating runway centerline information and an inertial reference system, said airplane guidance processor comprising:
    a first filter for generating a first velocity in a first predefined direction based on received velocities in the first predefined direction from the global positioning system and the inertial reference system;
    a second filter for generating a second velocity in a second predefined direction based on received velocities in the second predefined direction from the global positioning system and the inertial reference system; and
    a third filter for generating a cross-runway velocity and a lateral distance from runway centerline based on the generated runway centerline information and the generated first and second velocities.

2. The processor of claim 1, wherein said third filter further generates the lateral distance from runway centerline based on a lateral distance from runway centerline value received from the global positioning system.

3. The processor of claim 1, wherein the first, second, and third filters are Kalman filters.

4. The processor of claim 1, wherein the first, second, and third filters are complementary filters, respectively.

5. The processor of claim 4, wherein the first and second complementary filters estimate velocity and acceleration biases in the first and second predefined directions of the velocities received from the inertial reference system based on the velocities received from the global positioning system.

6. The processor of claim 5, wherein the first and second complementary filters provide a correcting component for generating the first and second velocities based on the estimated velocity and acceleration biases when the velocities received from the global positioning system become unacceptable.

7. A method for generating airplane navigational signals comprising:
    generating a first velocity in a first predefined direction based on received global positioning and inertial reference velocities in the first predefined direction;
    generating a second velocity in a second predefined direction based on received global positioning and inertial reference velocities in the second predefined direction; and
    generating a cross-runway velocity and a lateral distance from runway centerline value based on received runway centerline information and the generated first and second velocities.

8. The method of claim 7, wherein generating a cross-runway velocity and a lateral distance from runway centerline further generates the lateral distance from runway centerline based on a received global positioning lateral distance from runway centerline value.

9. The method of claim 8, wherein generating a first and second velocity further comprise estimating velocity and acceleration biases in the first and second predefined directions of the received inertial reference velocities based on the received global positioning velocities.

10. The method of claim 9, wherein generating a first and second velocity further comprise generating the first and second velocities based on the estimated velocity and acceleration biases.

11. An airplane precision guidance system comprising:
    a global positioning landing system with a differential GPS ground station for generating velocities;
    an inertial reference system for generating velocities; and
    a guidance processor for generating a cross-runway velocity and a lateral distance from runway centerline based on received runway centerline information and the velocities generated by the global positioning landing system and the inertial reference system.

12. The system of claim 11, further comprising a memory for prestoring said runway centerline information.

13. The system of claim 11, wherein said global positioning landing system comprises a ground station for generating differential global positioning system information.

14. The system of claim 13, wherein said runway centerline information is prestored at the ground station.

15. The system of claim 11, wherein the guidance processor is a component of the global positioning system.

16. The system of claim 11, wherein the guidance processor is a component of the inertial reference system.

17. The system of claim 11, further comprising an autopilot system for generating airplane control signals based on the generated cross-runway velocity and lateral distance from runway centerline.

18. The system of claim 17, wherein the guidance processor is a component of the autopilot system.

19. The system of claim 11, wherein the guidance processor comprises:
    a first filter for generating a first velocity in a first predefined direction based on received velocities in the first predefined direction from the global positioning system and the inertial reference system;
    a second filter for generating a second velocity in a second predefined direction based on received velocities in the second predefined direction from the global positioning system and the inertial reference system; and
    a third filter for generating a cross-runway velocity and a lateral distance from runway centerline based on received runway centerline information and the generated first and second velocities.

20. The system of claim 19, wherein said third filter further generates the lateral distance from runway centerline based on a lateral distance from runway centerline value received from the global positioning system.

21. The system of claim 19, wherein the first, second, and third filters are Kalman filters.

22. The system of claim 19, wherein the first, second, and third filters are complementary filters, respectively.

23. The system of claim 22, wherein the first and second complementary filters further comprise a bias estimating component for estimating velocity and acceleration biases in the first and second predefined directions of the velocities received from the inertial reference system based on the velocities received from the global positioning system.

24. The system of claim 23, wherein the first and second complementary filters further comprise a correcting component for generating the first and second velocities based on the generated velocity and acceleration biases when the velocities received from the global positioning system become unacceptable.

25. The system of claim 19, including a plurality of inertial reference systems for generating velocities and wherein said guidance processor includes a first and second filters for each of said inertial reference systems and selects which of the first and second velocities produced by said first and second filters to use.

26. The system of claim 25 wherein said plurality of inertial reference systems is three and wherein said selection is based on which of the first and second velocities lies between the other two first and second velocities.

27. An airplane precision guidance method comprising:
generating global positioning velocities;
generating inertial reference velocities; and
generating a cross-runway velocity and a lateral distance from runway centerline based on received runway centerline information and the global positioning and inertial reference velocities.

28. The method of claim 27, wherein said global positioning information comprises differential global positioning information.

29. The method of claim 27, wherein generating a cross-runway velocity and a lateral distance from runway centerline comprises:
generating a first velocity in a first predefined direction based on the global positioning and inertial reference velocities defined in the first predefined direction;
generating a second velocity in a second predefined direction based on the global positioning and inertial reference velocities defined in the second predefined direction; and
generating a cross-runway velocity and a lateral distance from runway centerline value based on runway centerline information and the generated first and second velocities.

30. The method of claim 29, wherein generating a cross-runway velocity and a lateral distance from runway centerline value further generates the lateral distance from runway centerline value based on a global positioning lateral distance from runway centerline value.

31. The method of claim 29, wherein generating a first and second velocity further comprise estimating velocity and acceleration biases in the first and second predefined directions of the inertial reference velocities based on the received global positioning velocities.

32. The method of claim 31, wherein generating a first and second velocity further comprise generating the first and second velocities based on the estimated velocity and acceleration biases.

33. The method of claim 27, wherein a plurality of inertial reference velocities are generated, first and second velocities are generated for each of said plurality of inertial reference velocities, and wherein one of said first and second velocities is selected for use in generating said cross-runway velocity and distance from runway centerline.

34. The method of claim 33, wherein said plurality of inertial reference velocities is three and wherein said selection is based on which of the three first and second velocities lies between the other two first and second velocities.

35. An airplane precision approach landing method comprising:
augmenting received global positioning information with inertial reference information;
generating inertial reference bias information during the global positioning information augmentation;
determining acceptability of the global positioning information during a precision approach to landing;
if while on a precision approach to landing the global positioning information is determined to be unacceptable before the airplane reaches a predefined distance from a safe landing and runway roll-out using only corrected inertial reference information, discontinuing the precision approach; and
if while on a precision approach to landing the global positioning information is determined to be unacceptable after the airplane passes a predefined distance from a safe landing and runway roll-out using only inertial reference information, continuing the precision approach using the inertial reference information corrected according to the last generated bias information.

36. An airplane precision approach landing system comprising:
a first component for augmenting received global positioning information with inertial reference information and generating inertial reference bias information during the global positioning information augmentation;
a second component for determining acceptability of the global positioning information during a precision approach to landing; and
a third component for discontinuing a precision approach, if while on the precision approach to landing the global positioning information is determined to be unacceptable before the airplane reaches a predefined distance from a safe landing and runway roll-out using inertial reference information, and using the inertial reference information adjusted according to the generated bias information, if while on a precision approach to landing the global positioning information is determined to be unacceptable after the airplane passes a predefined distance from a safe landing and runway roll-out.

* * * * *